United States Patent
Tang

(10) Patent No.: US 11,382,088 B2
(45) Date of Patent: Jul. 5, 2022

(54) WIRELESS COMMUNICATION METHOD AND TERMINAL DEVICE

(71) Applicant: Guangdong OPPO Mobile Telecommunications Corp., Ltd., Guangdong (CN)

(72) Inventor: Hai Tang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 98 days.

(21) Appl. No.: 16/877,038

(22) Filed: May 18, 2020

(65) Prior Publication Data

US 2020/0280973 A1    Sep. 3, 2020

Related U.S. Application Data

(63) Continuation of application No. PCT/CN2017/111371, filed on Nov. 16, 2017.

(51) Int. Cl.
 *H04W 72/04* (2009.01)
 *H04W 76/28* (2018.01)
 *H04L 1/18* (2006.01)

(52) U.S. Cl.
 CPC ......... *H04W 72/042* (2013.01); *H04L 1/1812* (2013.01); *H04W 76/28* (2018.02)

(58) Field of Classification Search
 CPC ... H04W 72/042; H04W 76/28; H04W 72/14; H04W 72/1268; H04W 72/1289; H04L 1/1812; H04L 1/1848; H04L 1/1858; H04L 1/1864; H04L 1/1822; H04L 5/0055; H04L 1/08; Y02D 30/70
 See application file for complete search history.

(56) References Cited

U.S. PATENT DOCUMENTS

| | | | | |
|---|---|---|---|---|
| 2018/0110084 A1* | 4/2018 | Dinan | ................... | H04W 76/28 |
| 2018/0167917 A1* | 6/2018 | Suzuki | .................... | H04W 4/70 |
| 2018/0367255 A1* | 12/2018 | Jeon | ....................... | H04L 5/0053 |

FOREIGN PATENT DOCUMENTS

| | | |
|---|---|---|
| CN | 101965037 A | 2/2011 |
| CN | 102215553 A | 10/2011 |
| CN | 102625432 A | 8/2012 |
| CN | 103889039 A | 6/2014 |

(Continued)

OTHER PUBLICATIONS

Extended European Search Report issued in corresponding European Application No. EP 17931938.9, dated Feb. 5, 2021, 21 pages.

(Continued)

*Primary Examiner* — Kiet Tang
(74) *Attorney, Agent, or Firm* — Bayes PLLC

(57) ABSTRACT

A wireless communication method and a terminal device are provided. The terminal device can flexibly start a hybrid automatic repeat request (HARQ) round trip time (RTT) timer, thereby saving power. The method includes monitoring, by a terminal device, a physical downlink control channel (PDCCH) in a discontinuous reception (DRX) period, where the uplink grant indicates an asynchronous HARQ process used for transmitting a physical uplink shared channel (PUSCH). The method further includes starting, by the terminal device, an uplink HARQ RTT timer for the asynchronous HARQ process at a first moment after detecting the PDCCH.

10 Claims, 7 Drawing Sheets

(56) References Cited

FOREIGN PATENT DOCUMENTS

| CN | 103918200 | A | 7/2014 |
|---|---|---|---|
| CN | 104412524 | A | 3/2015 |
| CN | 105722195 | A | 6/2016 |
| CN | 106533633 | A | 3/2017 |
| CN | 2017122135 | A1 | 7/2017 |
| EP | 3226456 | A1 | 4/2017 |
| JP | 2020109880 | A | 7/2020 |
| RU | 2558733 | C2 | 8/2015 |
| WO | 2016175007 | A1 | 11/2016 |
| WO | 2017122135 | A | 7/2017 |

OTHER PUBLICATIONS

International Application No. PCT/CN2017/111371, International search report, dated Aug. 8, 2018, 2 pages.
Huawei, HiSilicon, Correction on DRX for SPS in eMTC, R2-167805, 3GPP TSG-RAN WG2 #96, Reno, Nevada, USA, Nov. 14-18, 2016.
Extended European Search Report issued in corresponding European Application No. EP 19 93 1938, dated Feb. 5, 2021, 21 pages.
First Office action issued in corresponding Russian Application No. 2020119819/07, dated Dec. 24, 2020, 12 pages.
3rd Generation Partnership Project; Technical Specification Group Radio Access Network; Evolved Universal Terrestrial Radio Access (E-UTRA); Medium Access Control (MAC) protocol specification (Release 14), 3GPP TS 36.321 V14.4.0. (Sep. 2017); 108 pages.
"HARQ RTT timer and DRX retransmission timer", Agenda Item: 10.3.1.10; Source: ASUSTeK; 3GPP TSG-RAN 2G2 Meeting #99-Bis, R2-1711083, Prague, Czech Republic, Oct. 9-13, 2017, 5 pages.
"The start condition of the UL HARQ RTT timer", Agenda Item: 10.3.1.10, Source: OPPO, 3GPP TSG RAN WG2 #100, R2-1712204, Reno, USA, Nov. 27-Dec. 1, 2017, 3 pages.
First Office Action issued in corresponding Chinese Application No. 202010388443.8, dated May 26, 2021, 12 pages.
First Office Action issued in corresponding Canadian Application No. 3,082,915, dated Jul. 6, 2021, 6 pages.
Request for SIPO Patent Priority Review issued in corresponding Chinese Application No. 202010388443.8, dated Apr. 21, 2021, 6 pages.
ZTE, Consideration on DRX, R2-1710321, 3GPP TSG-RAN WG2 Meeting#99bis, Prague, Czech Republic, Oct. 9-13, 2017.
First Office action issued in corresponding India Application No. 202017025223, dated Jul. 29, 2021, 7 pages.
The Second Office Action issued in corresponding Chinese Application No. 202010388443.8, dated Aug. 13, 2021, 10 pages.
Communication pursuant to Article 94(3) EPC issued in corresponding European Application No. 17931938.9, dated Sep. 30, 2021, 14 pages.
Notice of Reasons for Refusal issued in corresponding Japanese Application No. 2020-527085, dated Oct. 1, 2021, 8 pages.
"Introduction of uplink HARQ-ACK feedback in NB-IoT in 36.321", Source to WG: Ericsson, 3GPP TSG-RAN2 Meeting #99bis, R2-1710740, Prague, Czech Republic, Oct. 9-13, 2017, 5 pages.
"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.3.0 (Jun. 2017), 107 pages.
Third Office Action issued in corresponding Chinese Application No. 202010388443.8, dated Nov. 19, 2021, 10 pages.
First Office Action issued in corresponding Taiwanese Application No. 107140907, dated Nov. 30, 2021, 11 pages.
Notification to Grant Patent Right for Invention issued in corresponding Chinese Application No. 202010388443.8, dated Feb. 23, 2022, 6 pages.
First Office action issued in corresponding Korean Application No. 10-2020-7017120, dated Mar. 8, 2022, 10 pages.
"Discussion on HARQ RTT Timer", Agenda Item: 10.3.1.10, Source: vivo, 3GPP TSG-RAN WG2 Meeting #99bis, R2-1710972, Prague, Czech Republic, Oct. 9-13, 2017, 4 pages.

\* cited by examiner

200

| The terminal device monitors a PDCCH in a DRX period, the PDCCH carries an uplink grant, and the uplink grant indicates an asynchronous HARQ process used for transmitting the PUSCH | ~ 210 |

| The terminal device starts an uplink HARQ RTT timer for the asynchronous HARQ process at a first moment after detecting the PDCCH | ~ 220 |

FIG. 2

WIRELESS COMMUNICATION METHOD AND TERMINAL DEVICE

CROSS-REFERENCES TO RELATED APPLICATIONS

This application is a continuation of and claims priority to International Patent Application PCT/CN2017/111371, filed Nov. 16, 2017, the contents of which is hereby incorporated by reference in its entirety.

BACKGROUND OF THE INVENTION

Technical Field

This application relates to the communications field, and more specifically, to a wireless communication method and a terminal device.

Related Art

In a Long Term Evolution (LTE) system, a hybrid automatic repeat request (HARQ) round trip time (RTT) timer is defined for each asynchronous HARQ process. That is, an uplink HARQ RTT timer is maintained for each asynchronous HARQ process. When the timer is started, a terminal device does not need to monitor a physical downlink control channel (PDCCH) for the asynchronous HARQ process within the duration of the timer.

In new radio (NR) communication of 5th-Generation (5G) mobile communications technologies, a repetition of a physical uplink shared channel (PUSCH) needs to be considered to determine the timing of starting an uplink HARQ RTT timer, to meet a power-saving requirement.

SUMMARY OF THE INVENTION

Embodiments of this application provide a wireless communication method and a terminal device. The terminal device can flexibly start an HARQ RTT timer, thereby saving power.

According to a first aspect, an embodiment of this application provides a wireless communication method, including monitoring, by a terminal device, a PDCCH in a discontinuous reception (DRX) period, wherein the PDCCH carries an uplink grant, and the uplink grant indicates an asynchronous HARQ process used for transmitting a PUSCH and starting, by the terminal device, an uplink HARQ RTT timer for the asynchronous HARQ process at a first moment after detecting the PDCCH.

Therefore, in the wireless communication method according to this embodiment of this application, after detecting a PDCCH that indicates an uplink asynchronous HARQ process, a terminal device starts an uplink HARQ RTT timer for the asynchronous HARQ process at a first moment, so that the terminal device does not need to monitor a PDCCH while the uplink HARQ RTT timer is started, thereby saving power.

Optionally, in an implementation of the first aspect, the method further includes receiving, by the terminal device, a repetition termination message fed back by a network device when the PUSCH is transmitted for the $n^{th}$ time, where n is a positive integer less than or equal to k, k is a maximum repetition number, and k is a positive integer greater than or equal to 1 and determining, by the terminal device, that the first moment is a moment at which the PUSCH is transmitted for the $n^{th}$ time.

It should be understood that, after the terminal device receives the repetition termination message fed back by the network device, it indicates that the network device has successfully received the PUSCH, and the repetition can be ended without needing to wait until the maximum repetition number is reached.

Therefore, in the wireless communication method according to this embodiment of this application, a terminal device can start an uplink HARQ RTT timer for an asynchronous HARQ process when receiving a repetition termination message, so that the terminal device can end in advance monitoring of a PDCCH, thereby saving power.

Optionally, in an implementation of the first aspect, the repetition termination message is dynamic scheduling information indicated by using the PDCCH, or, the repetition termination message is an acknowledgment (ACK) frame or a negative-acknowledgment (NACK) frame indicated by using the PDCCH.

Optionally, in an implementation of the first aspect, the first moment is a moment of the first transmission of the PUSCH.

Therefore, in the wireless communication method according to this embodiment of this application, an uplink HARQ RTT timer is started as soon as a PUSCH is transmitted for the first time, so that a terminal device does not need to monitor a PDCCH while the uplink HARQ RTT timer is started, thereby saving power.

Optionally, in an implementation of the first aspect, the first transmission of the PUSCH is the first of k repetitions of the PUSCH transmission, k is a maximum repetition number, and k is a positive integer greater than or equal to 1.

Optionally, in an implementation of the first aspect, the first moment is a moment at which the PUSCH is transmitted for the $k^{th}$ time, k is a maximum repetition number, and k is a positive integer greater than or equal to 1.

Optionally, in an implementation of the first aspect, the maximum repetition number is configured for the asynchronous HARQ process by the network device.

Optionally, in an implementation of the first aspect, the maximum repetition number is preconfigured for the asynchronous HARQ process.

According to a second aspect, an embodiment of this application provides a wireless communication method, including determining, by the terminal device, that an uplink grant exists at a current moment, where the uplink grant indicates an asynchronous HARQ process used for transmitting a PUSCH and starting, by the terminal device, an uplink HARQ RTT timer for the asynchronous HARQ process at a first moment.

Therefore, in the wireless communication method according to this embodiment of this application, after determining that an uplink grant that indicates an uplink asynchronous HARQ process exists at a current moment, a terminal device starts an uplink HARQ RTT timer for the asynchronous HARQ process at a first moment, so that the terminal device does not need to monitor a PDCCH while the uplink HARQ RTT timer is started, thereby saving power.

Optionally, in an implementation of the second aspect, the method further includes receiving, by the terminal device, a repetition termination message fed back by a network device when the PUSCH is transmitted for the $n^{th}$ time, where n is a positive integer less than or equal to k, k is a maximum repetition number, and k is a positive integer greater than or equal to 1 and determining, by the terminal device, that the first moment is a moment at which the PUSCH is transmitted for the $n^{th}$ time.

It should be understood that, after the terminal device receives the repetition termination message fed back by the network device, it indicates that the network device has successfully received the PUSCH, and the repetition can be ended without needing to wait until the maximum repetition number is reached.

Therefore, in the wireless communication method according to this embodiment of this application, a terminal device can start an uplink HARQ RTT timer for an asynchronous HARQ process when receiving a repetition termination message, so that the terminal device can end in advance monitoring of a PDCCH, thereby saving power.

Optionally, in an implementation of the second aspect, the repetition termination message is dynamic scheduling information indicated by using the PDCCH, or, the repetition termination message is an ACK frame or a NACK frame indicated by using the PDCCH.

Optionally, in an implementation of the second aspect, the first moment is a moment of the first transmission of the PUSCH.

Therefore, in the wireless communication method according to this embodiment of this application, an uplink HARQ RTT timer is started as soon as a PUSCH is transmitted for the first time, so that a terminal device does not need to monitor a PDCCH while the uplink HARQ RTT timer is started, thereby saving power.

Optionally, in an implementation of the second aspect, the first transmission of the PUSCH is the first of k repetitions of the PUSCH, k is a maximum repetition number, and k is a positive integer greater than or equal to 1.

Optionally, in an implementation of the second aspect, the first moment is a moment at which the PUSCH is transmitted for the $k^{th}$ time, k is a maximum repetition number, and k is a positive integer greater than or equal to 1.

Optionally, in an implementation of the second aspect, the maximum repetition number is configured for the asynchronous HARQ process by the network device.

Optionally, in an implementation of the second aspect, the maximum repetition number is preconfigured for the asynchronous HARQ process.

According to a third aspect, an embodiment of this application provides a terminal device, which can perform the modules or units in the method according to any one of the first aspect or the optional implementations of the first aspect.

According to a third aspect, an embodiment of this application provides a terminal device, which can perform the modules or units in the method according to any one of the second aspect or the optional implementations of the second aspect.

According to a fifth aspect, a network device is provided. The network device includes a processor, a memory, and a communications interface. The processor and the memory are connected to the communications interface. The memory is configured to store an instruction, the processor is configured to execute the instruction, and the communications interface is configured to communicate with other network elements under the control of the processor. When the processor performs the instruction stored in the memory, the execution enables the processor to perform the method according to any one of the first aspect or the possible implementations of the first aspect.

According to a sixth aspect, a network device is provided. The network device includes a processor, a memory, and a communications interface. The processor and the memory are connected to the communications interface. The memory is configured to store an instruction, the processor is configured to execute the instruction, and the communications interface is configured to communicate with other network elements under the control of the processor. When the processor performs the instruction stored in the memory, the execution enables the processor to perform the method according to any one of the second aspect or the possible implementations of the second aspect.

According to a seventh aspect, a computer storage medium is provided. The computer storage medium stores program code, and the program code is used to instruct the computer to execute the instruction of the method according to any one of the first aspect or the possible implementations of the first aspect.

According to an eighth aspect, a computer storage medium is provided. The computer storage medium stores program code, and the program code is used to instruct the computer to execute the instruction of the method according to any one of the second aspect or the possible implementations of the second aspect.

According to a ninth aspect, a computer program product including an instruction is provided, and when the computer program product is run on a computer, the computer program product enables the computer to perform the method according to the foregoing aspects.

BRIEF DESCRIPTION OF THE DRAWINGS

FIG. 2 is a schematic flowchart of a wireless communication method according to an embodiment of this application.

DETAILED DESCRIPTION OF THE INVENTION

The technical solutions of the embodiments of this application are clearly and completely described below with reference to the accompanying drawings of the embodiments of this application.

The technical solution of the embodiments of this application may be applied to various communications systems, for example: an LTE system, an LTE frequency division duplex (FDD) system, an LTE time division duplex (TDD) system, a Universal Mobile Telecommunications System (UMTS), a Worldwide Interoperability for Microwave Access (WiMAX) communications system or a 5G communications system and the like.

The terminal device in the embodiments of this application may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. Alternatively, the terminal device may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a 5G network, or a terminal device in a future evolved public land mobile network (PLMN). This is not limited in the embodiments of this application.

The embodiments are described with reference to a network device in this application. In the embodiments of this application, the network device may be a device configured to communicate with a terminal device, and the access network device may be an evolutional nodeB (eNB or eNodeB) in the LTE system, and may be alternatively a wireless controller in a cloud radio access network (CRAN) scenario. Alternatively, the access network device may be a relay station, an access point, an in-vehicle device, a wearable device, a next generation evolutional nodeB (NG-eNB), an access network device (for example, gNB) in a 5G network, an access network device in a future evolved PLMN, or the like. This is not limited in the embodiments of this application.

Figure 1:
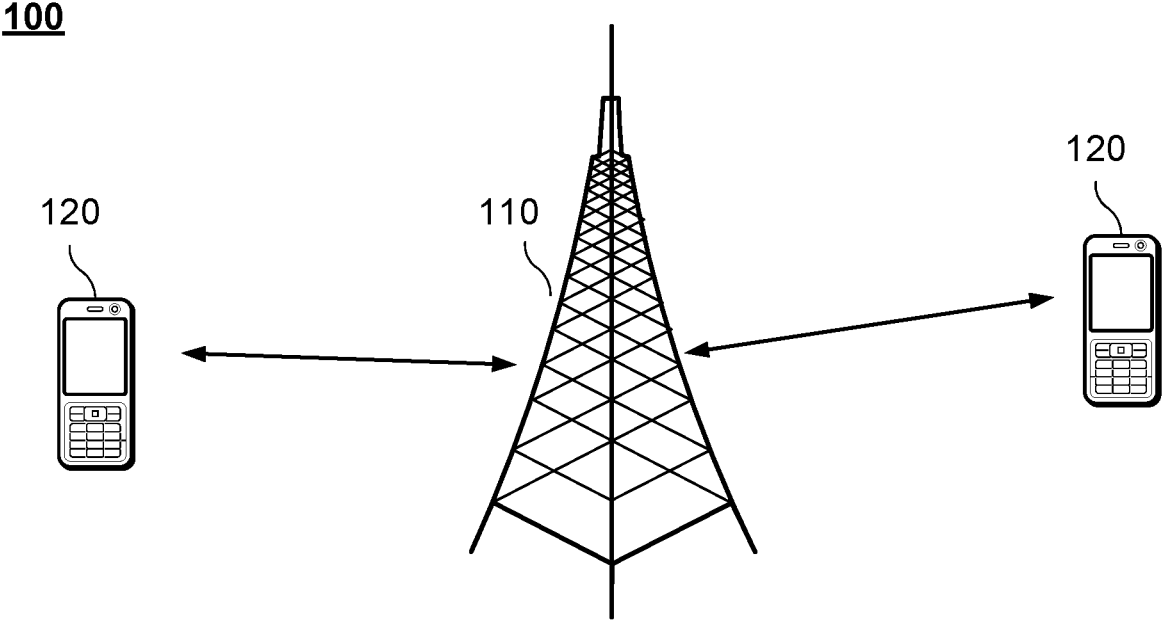
FIG. 1 is a schematic diagram of an application scenario according to an embodiment of this application.

FIG. 1 shows one network device and two terminal devices as an example. Optionally, the wireless communications system 100 may include a plurality of network devices, and another quantity of terminal devices may be included in the coverage of each network device. This is not limited in this embodiment of this application.

Optionally, the wireless communications system 100 may further include other network entities such as a network controller, a mobility management entity (MME), and an access and mobility management function (AMF). This is not limited in this embodiment of this application.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (CD), a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to various media that can store, contain and/or carry an instruction and/or data.

It should be understood that, the terms "system" and "network" may be used interchangeably in this specification. The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

FIG. 2 is a schematic flowchart of a wireless communication method 200 according to an embodiment of this application. Optionally, the method 200 may be optionally applied to the system shown in FIG. 1. This is not limited herein. The method 200 includes at least a part of the following content.

210. A terminal device monitors to a PDCCH in a DRX period, where the PDCCH carries an uplink grant, and the uplink grant indicates an asynchronous HARQ process used for transmitting a PUSCH.

Optionally, the terminal device can transmit the PUSCH on the asynchronous HARQ process according to the uplink grant.

220. The terminal device starts an uplink HARQ RTT timer for the asynchronous HARQ process at a first moment after detecting the PDCCH.

It should be understood that while the uplink HARQ RTT timer is started, the terminal device does not intend to monitor a PDCCH for the asynchronous HARQ process.

Optionally, when the terminal device transmits the PUSCH by using the asynchronous HARQ process, if the transmission fails, the terminal device needs to repeat the PUSCH by using the asynchronous HARQ process.

Optionally, the asynchronous HARQ process has a maximum repetition number. If a repetition number exceeds the maximum repetition number, it may be considered that the data transmission fails. In this case, the asynchronous HARQ process does not need to be repeated.

For example, the maximum repetition number of an asynchronous HARQ process a is k. If the terminal device fails to transmit the uplink data Q after n k transmissions by using the asynchronous HARQ process a, the terminal device considers that the uplink data Q fails to be transmitted and does not need to repeat the uplink data Q.

Optionally, the maximum repetition number is configured for the asynchronous HARQ process by a network device.

Optionally, the maximum repetition number is preconfigured for the asynchronous HARQ process.

Optionally, the terminal device can determine the first moment in the following manners:

Manner 1:

The terminal device receives a repetition termination message fed back by a network device when the PUSCH is transmitted for the $n^{th}$ time, where n is a positive integer less than or equal to k, k is a maximum repetition number, and k is a positive integer greater than or equal to 1.

The terminal device determines that the first moment is a moment at which the PUSCH is transmitted for the $n^{th}$ time.

Optionally, the $n^{th}$ transmission of the PUSCH means the $n^{th}$ repetition that takes place after the terminal device still fails to transmit the PUSCH after n−1 consecutive repetitions.

Optionally, the repetition termination message is dynamic scheduling information indicated by using the PDCCH by the network device.

Optionally, the repetition termination message is an ACK frame or a NACK frame indicated by using the PDCCH.

It should be understood that, after the terminal device receives the repetition termination message fed back by the network device, it indicates that the network device has successfully received the PUSCH, and the repetition can be ended without needing to wait until the maximum repetition number is reached.

Manner 2:

The terminal device determines that the first moment is a moment of the first transmission of the PUSCH.

It should be understood that, the moment at which the PUSCH is transmitted for the first time is not a special case of n=1 in Manner 1. In Manner 2, the terminal device does not need to receive a message fed back by the network device.

Optionally, the first transmission of the PUSCH means that the terminal device transmits the PUSCH for the first time.

Optionally, if the first transmission of the PUSCH fails, the PUSCH may be repeated.

Optionally, when the terminal device determines that the first moment is the moment at which the PUSCH is transmitted for the first time, it may be understood that the terminal device does not intend to receive a PDCCH for the asynchronous HARQ process at the moment of transmitting the PUSCH for the first time. If the PUSCH is repeated subsequently, the terminal device still does not intend to receive a PDCCH for the asynchronous HARQ process.

Optionally, the first transmission of the PUSCH is the first of k repetitions of the PUSCH transmission, k is a maximum repetition number, and k is a positive integer greater than or equal to 1.

Manner 3:

The terminal device determines that the first moment is a moment at which the PUSCH is transmitted for the $k^{th}$ time, k is a maximum repetition number, and k is a positive integer greater than or equal to 1.

Optionally, the $k^{th}$ transmission of the PUSCH means that the terminal device repeats the PUSCH for the last time.

Optionally, in this case, the terminal device starts the uplink HARQ RTT timer for the asynchronous HARQ process at a subframe corresponding to the PUSCH repeated for the last time.

Therefore, in Manner 1 according to this embodiment of this application, a terminal device can start an uplink HARQ RTT timer for an asynchronous HARQ process when receiving a repetition termination message, so that the terminal device can end in advance monitoring of a PDCCH, thereby saving power.

In Manner 2 according to this embodiment of this application, an uplink HARQ RTT timer is started as soon as a PUSCH is transmitted for the first time, so that a terminal device does not need to monitor a PDCCH while the uplink HARQ RTT timer is started, thereby saving power.

In Manner 3 according to this embodiment of this application, an uplink HARQ RTT timer is started as soon as a PUSCH is transmitted for the last time, so that data can be transmitted as reliably as possible, and a terminal device does not need to monitor a PDCCH while the uplink HARQ RTT timer is started, thereby saving power.

Figure 3:
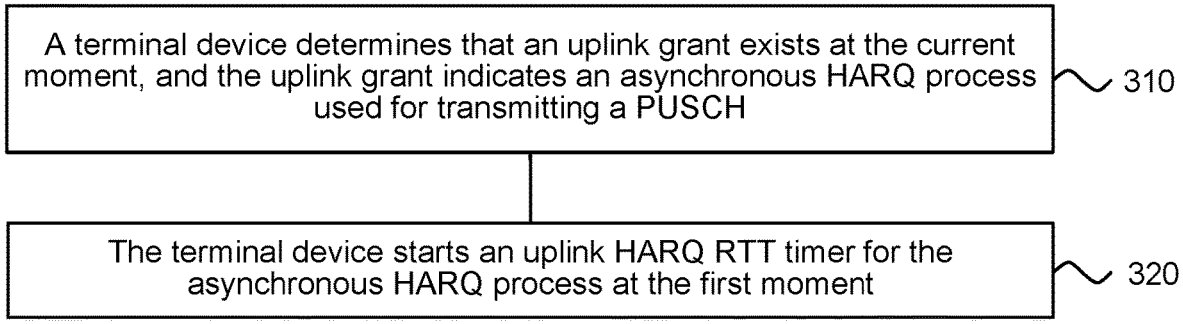
FIG. 3 is a schematic flowchart of another wireless communication method according to an embodiment of this application.

FIG. 3 is a schematic flowchart of a wireless communication method 300 according to an embodiment of this application. Optionally, the method 300 may be applied to the system shown in FIG. 1. This is not limited herein. The method 300 includes at least a part of the following content.

310. A terminal device determines that an uplink grant exists at a current moment, where the uplink grant indicates an asynchronous HARQ process used for transmitting a PUSCH.

Optionally, the terminal device can transmit the PUSCH on the asynchronous HARQ process according to the uplink grant.

320. The terminal device starts an uplink HARQ RTT timer for the asynchronous HARQ process at a first moment.

Optionally, the maximum repetition number is configured for the asynchronous HARQ process by a network device.

Optionally, the maximum repetition number is preconfigured for the asynchronous HARQ process.

Optionally, the terminal device can determine the first moment in the following manners:

Manner 1:

The terminal device receives a repetition termination message fed back by a network device when the PUSCH is transmitted for the $n^{th}$ time, where n is a positive integer less than or equal to k, k is a maximum repetition number, and k is a positive integer greater than or equal to 1; and The terminal device determines that the first moment is a moment at which the PUSCH is transmitted for the $n^{th}$ time.

Optionally, the $n^{th}$ transmission of the PUSCH means the $n^{th}$ repetition that takes place after the terminal device still fails to transmit the PUSCH after n−1 consecutive repetitions.

Optionally, the repetition termination message is dynamic scheduling information indicated by using the PDCCH by the network device.

Optionally, the repetition termination message is an ACK frame or a NACK frame indicated by using the PDCCH.

It should be understood that, after the terminal device receives the repetition termination message fed back by the network device, it indicates that the network device has successfully received the PUSCH, and the repetition can be ended without needing to wait until the maximum repetition number is reached.

Manner 2:

The terminal device determines that the first moment is a moment of the first transmission of the PUSCH.

Optionally, the first transmission of the PUSCH means that the terminal device transmits the PUSCH for the first time.

Optionally, if the first transmission of the PUSCH fails, the PUSCH may be repeated.

Optionally, when the terminal device determines that the first moment is the moment at which the PUSCH is transmitted for the first time, it may be understood that the terminal device does not intend to receive a PDCCH for the asynchronous HARQ process at the moment of transmitting the PUSCH for the first time. If the PUSCH is repeated subsequently, the terminal device still does not intend to receive a PDCCH for the asynchronous HARQ process.

It should be understood that, the moment at which the PUSCH is transmitted for the first time is not a special case of n=1 in Manner 1. In Manner 2, the terminal device does not need to receive a message fed back by the network device.

Optionally, the first transmission of the PUSCH is the first of k repetitions of the PUSCH transmission, k is a maximum repetition number, and k is a positive integer greater than or equal to 1.

Manner 3:

The terminal device determines that the first moment is a moment at which the PUSCH is transmitted for the $k^{th}$ time, k is a maximum repetition number, and k is a positive integer greater than or equal to 1.

Optionally, the $k^{th}$ transmission of the PUSCH means that the terminal device repeats the PUSCH for the last time.

Optionally, in this case, the terminal device starts the uplink HARQ RTT timer for the asynchronous HARQ process at a subframe corresponding to the PUSCH repeated for the last time.

Therefore, in Manner 1 according to this embodiment of this application, a terminal device can start an uplink HARQ RTT timer for an asynchronous HARQ process when receiving a repetition termination message, so that the terminal device can end in advance monitoring of a PDCCH, thereby saving power.

In Manner 2 according to this embodiment of this application, an uplink HARQ RTT timer is started as soon as a PUSCH is transmitted for the first time, so that a terminal device does not need to monitor a PDCCH while the uplink HARQ RTT timer is started, thereby saving power.

In Manner 3 according to this embodiment of this application, an uplink HARQ RTT timer is started as soon as a PUSCH is transmitted for the last time, so that data can be transmitted as reliably as possible, and the terminal device does not need to monitor a PDCCH while the uplink HARQ RTT timer is started, thereby saving power.

Figure 4:
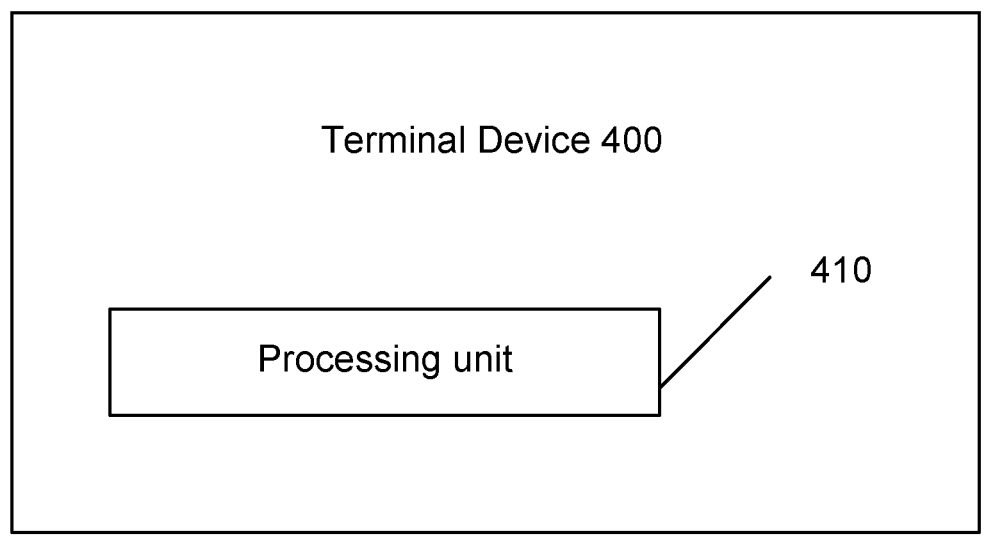
FIG. 4 is a schematic block diagram of a terminal device according to an embodiment of this application.

FIG. 4 is a schematic block diagram of a terminal device 400 according to an embodiment of this application. As shown in FIG. 4, the terminal device 400 includes a processing unit 410, configured to monitor a PDCCH in a DRX period, where the PDCCH carries an uplink grant, and the uplink grant indicates an asynchronous HARQ process used for transmitting a PUSCH, where after the processing unit 410 detects the PDCCH, the processing unit 410 starts an uplink HARQ RTT timer for the asynchronous HARQ process at a first moment.

Optionally, the terminal device 400 further includes a receiving unit 420, configured to receive a repetition termination message fed back by a network device when the PUSCH is transmitted for the $n^{th}$ time, where n is a positive integer less than or equal to k, k is a maximum repetition number, and k is a positive integer greater than or equal to 1, where the processing unit 410 is further configured to determine that the first moment is a moment at which the PUSCH is transmitted for the $n^{th}$ time.

Optionally, the repetition termination message is dynamic scheduling information indicated by using the PDCCH, or, the repetition termination message is an ACK frame or a NACK frame indicated by using the PDCCH.

Optionally, the first moment is a moment of the first transmission of the PUSCH.

Optionally, the first transmission of the PUSCH is the first of k repetitions of the PUSCH transmission, k is a maximum repetition number, and k is a positive integer greater than or equal to 1.

Optionally, the first moment is a moment at which the PUSCH is transmitted for the $k^{th}$ time, k is a maximum repetition number, and k is a positive integer greater than or equal to 1.

Optionally, the maximum repetition number is configured for the asynchronous HARQ process by a network device.

Optionally, the maximum repetition number is preconfigured for the asynchronous HARQ process.

It should be understood that a corresponding procedure of a terminal device in the method 200 in FIG. 2 is respectively implemented according to the foregoing and other operations and/or functions of each module in the terminal device 400 according to the embodiments of this application. For brevity, details are not described herein again.

Figure 5:
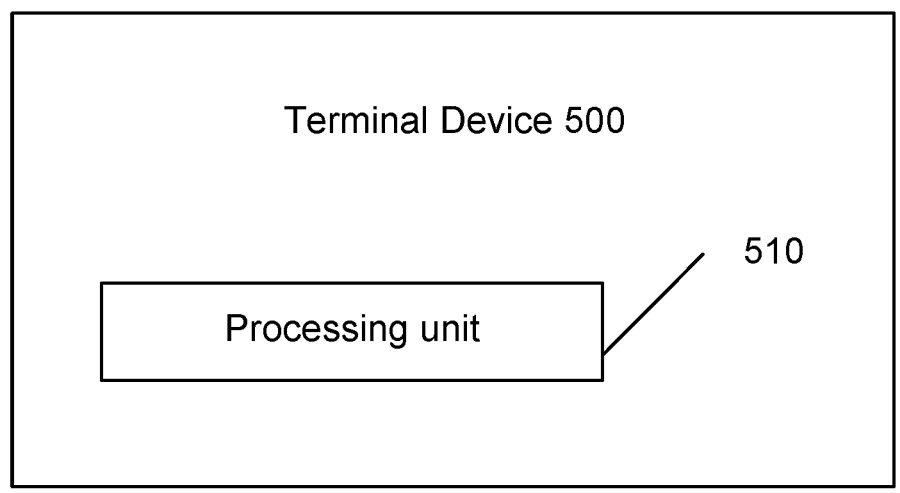
FIG. 5 is a schematic block diagram of another terminal device according to an embodiment of this application.

FIG. 5 is a schematic block diagram of a terminal device 500 according to an embodiment of this application. As shown in FIG. 5, the terminal device 500 includes a processing unit 510, configured to determine that an uplink grant exists at a current moment, where the uplink grant indicates an asynchronous HARQ process used for transmitting a PUSCH, where the processing unit 510 is further configured to start an uplink HARQ RTT timer for the asynchronous HARQ process at a first moment.

Optionally, the terminal device 500 further includes a receiving unit 520, configured to receive a repetition termination message fed back by a network device when the PUSCH is transmitted for the $n^{th}$ time, where n is a positive integer less than or equal to k, k is a maximum repetition number, and k is a positive integer greater than or equal to 1, where the processing unit 510 is further configured to determine that the first moment is a moment at which the PUSCH is transmitted for the $n^{th}$ time.

Optionally, the repetition termination message is dynamic scheduling information indicated by using the PDCCH, or, the repetition termination message is an ACK frame or a NACK frame indicated by using the PDCCH.

Optionally, the first moment is a moment of the first transmission of the PUSCH.

Optionally, the first transmission of the PUSCH is the first of k repetitions of the PUSCH transmission, k is a maximum repetition number, and k is a positive integer greater than or equal to 1.

Optionally, the first moment is a moment at which the PUSCH is transmitted for the $k^{th}$ time, k is a maximum repetition number, and k is a positive integer greater than or equal to 1.

Optionally, the maximum repetition number is configured for the asynchronous HARQ process by a network device.

Optionally, the maximum repetition number is preconfigured for the asynchronous HARQ process.

It should be understood that a corresponding procedure of a terminal device in the method 300 in FIG. 3 is respectively implemented according to the foregoing and other operations and/or functions of each module in the terminal device 500 according to the embodiments of this application. For brevity, details are not described herein again.

Figure 6:
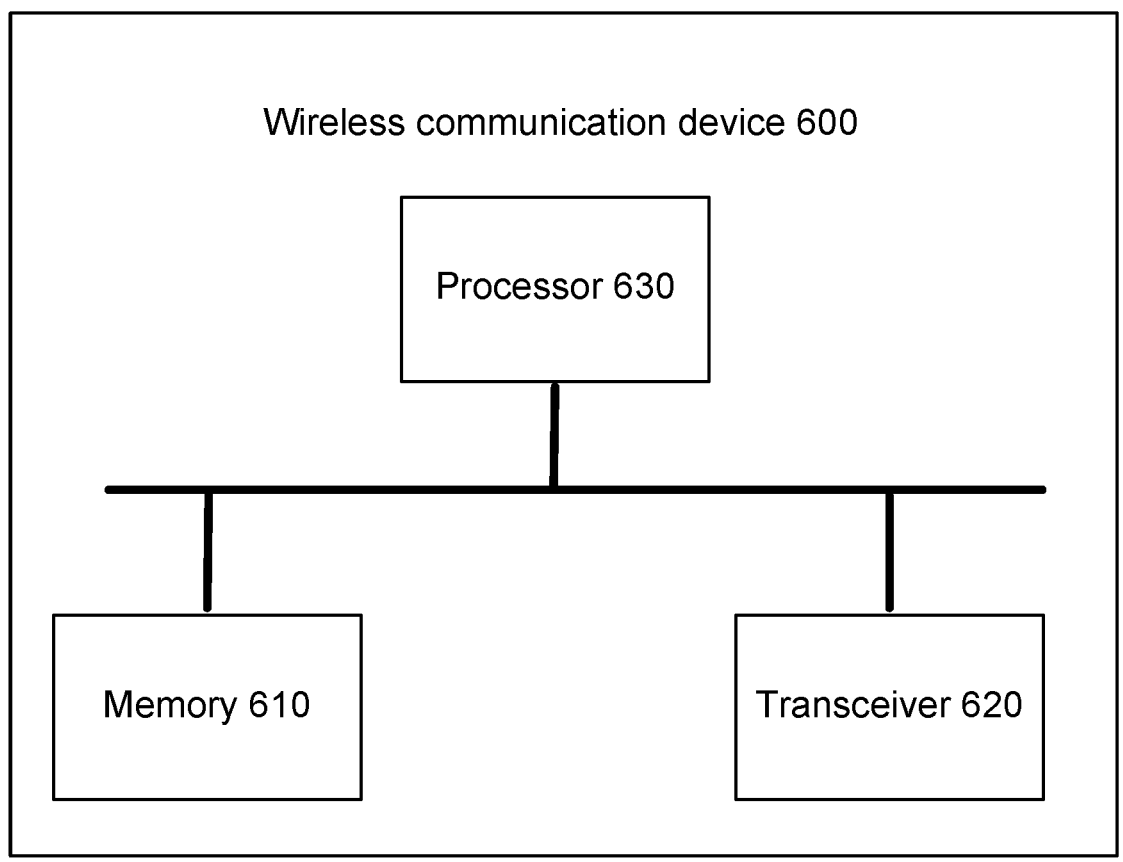
FIG. 6 is a schematic block diagram of a wireless communications device according to an embodiment of this application.

FIG. 6 is a schematic block diagram of a wireless communications device 600 according to an embodiment of this application. The device 600 includes a memory 610, configured to store a program, where the program includes code, a transceiver 620, configured to communicate with other devices, and a processor 630, configured to execute the code in the program in the memory 610.

Optionally, the transceiver 620 is configured to specifically send and receive signals under the driving of the processor 630.

Optionally, when the code is executed, the processor 630 may further implement each operation performed by the terminal device in the method 200 in FIG. 2 and the method 300 in FIG. 3. For brevity, details are not described herein again. In this case, the device 600 may be a terminal device, for example, a mobile phone.

It should be understood that, in this embodiment of this application, the processor 630 may be a central processing unit (CPU), or the processor 630 may be another general purpose processor, digital signal processor (DSP), application-specific integrated circuit (ASIC), field-programmable gate array (FPGA), or another programmable logic device, discrete gate or transistor logic device, or discrete hardware component, or the like. The general purpose processor may be a microprocessor, or the processor may be any conventional processor or the like.

The memory 610 may include a read-only memory (ROM) and a random access memory (RAM), and provides an instruction and data to the processor 630. A part of the memory 610 may further include a non-volatile RAM. For example, the memory 610 may further store device type information.

The transceiver 620 may be configured to implement functions of sending and receiving signals, for example, frequency modulation and demodulation functions, which are also referred to as up-conversion and down-conversion functions.

During implementation, at least one step of the foregoing method may be completed through an integrated logical circuit of hardware in the processor 630, or the integrated logical circuit can complete the at least one step under the driving of an instruction in a software form. Therefore, the wireless communications device 600 may be a chip or a chip set. Steps of the methods disclosed with reference to the embodiments of this application may be directly performed and completed by means of a hardware processor, or may be performed and completed by using a combination of hardware and software modules in the processor. The software module may be located in a mature storage medium in the field, such as a RAM, a flash memory, a ROM, a programmable ROM, an electrically-erasable programmable memory, or a register. The storage medium is located in the memory, and the processor 630 reads information in the memory and completes the steps in the foregoing methods in combination with hardware of the processor. To avoid repetition, details are not described herein again.

Figure 7:
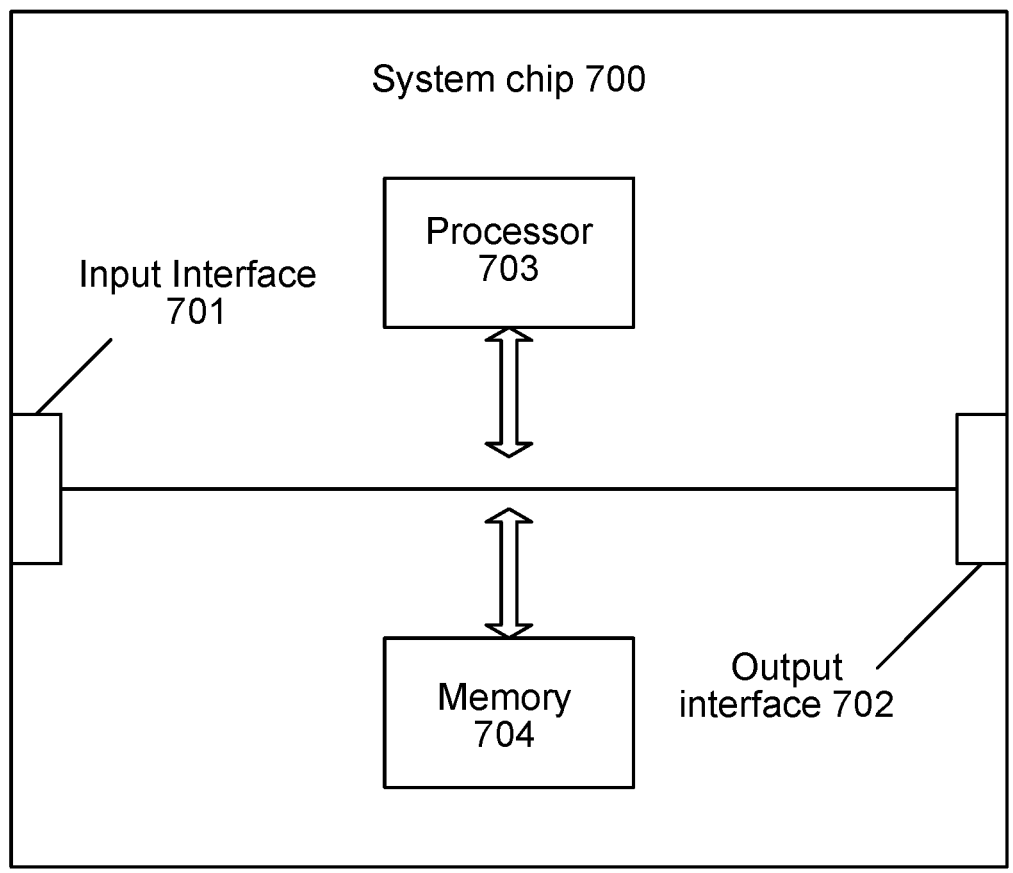
FIG. 7 is a schematic structural diagram of a system chip according to an embodiment of this application.

FIG. 7 is a schematic structural diagram of a system chip 700 according to an embodiment of this application. The system chip 700 in FIG. 7 includes an input interface 701, an output interface 702, a processor 703, and a memory 704 that may be connected to each other by using an internal communications connection line, and the processor 703 is configured to execute code in the memory 704.

Optionally, when the code is executed, the processor 703 implements the method performed by the terminal device in the method embodiments. For brevity, details are not described herein again.

All or some of the foregoing embodiments may be implemented by means of software, hardware, firmware, or any combination thereof. When software is used to implement the embodiments, all or some of the embodiments may be implemented in the form of a computer program product. The computer program product includes one or more computer instructions. When the computer program instructions are loaded and executed on the computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be noted that, in the embodiments of this application, sequence numbers of the foregoing processes do not indicate an execution sequence, and an execution sequence of processes shall be determined according to functions and internal logic thereof, and shall constitute no limitation on an implementation process of the embodiments of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method comprising:
monitoring, by a terminal device, to a physical downlink control channel (PDCCH) in a discontinuous reception (DRX) period, wherein the PDCCH carries an uplink grant, and the uplink grant indicates an asynchronous hybrid automatic repeat request (HARQ) process used for transmitting a physical uplink shared channel (PUSCH); and
starting, by the terminal device, an uplink HARQ round trip time (RTT) timer for the asynchronous HARQ process at a first moment after detecting the PDCCH, wherein the method further comprises:
receiving, by the terminal device, a repetition termination message fed back by a network device when the PUSCH is transmitted for an nth time, wherein n is a positive integer less than or equal to k, k is a maximum repetition number, and k is a positive integer greater than or equal to 1; and
wherein the starting the uplink HARQ RTT timer at the first moment comprises: starting, by the terminal device, the uplink HARQ RTT timer for the asynchronous HARQ process when receiving the repetition termination message.

2. The method of claim 1 wherein the maximum repetition number is configured for the asynchronous HARQ process by the network device.

3. The method of claim 1 wherein the maximum repetition number is preconfigured for the asynchronous HARQ process.

4. The method of claim 1 wherein the repetition termination message is dynamic scheduling information indicated by using the PDCCH, or, the repetition termination message is an acknowledgment (ACK) frame or a negative-acknowledgment (NACK) frame indicated by using the PDCCH.

5. A wireless communication method, comprising:
determining, by a terminal device, that an uplink grant exists at a current moment, wherein the uplink grant indicates an asynchronous hybrid automatic repeat request (HARQ) process used for transmitting a physical uplink shared channel (PUSCH); and
starting, by the terminal device, an uplink HARQ round trip time (RTT) timer for the asynchronous HARQ process at a first moment,
wherein the method further comprises:
receiving, by the terminal device, a repetition termination message fed back by a network device when the PUSCH is transmitted for the $n^{th}$ time, wherein n is a positive integer less than or equal to k, k is a maximum repetition number, and k is a positive integer greater than or equal to 1; and
wherein the starting the uplink HARQ RTT timer at the first moment comprises: starting, by the terminal device, the uplink HARQ RTT timer for the asynchronous HARQ process when receiving the repetition termination message.

6. The method of claim 5 wherein the maximum repetition number is configured for the asynchronous HARQ process by the network device, or is preconfigured for the asynchronous HARQ process.

7. A terminal device comprising:
a memory configured to store computer-executable instructions; and
one or more processors in communication with the memory and configured to execute the computer-executable instructions to at least:
monitor a physical downlink control channel (PDCCH) in a discontinuous reception (DRX) period, wherein the PDCCH carries an uplink grant, and the uplink grant indicates an asynchronous hybrid automatic repeat request (HARQ) process used for transmitting a physical uplink shared channel (PUSCH); and
start an uplink HARQ round trip time (RTT) timer for the asynchronous HARQ process after detecting the PDCCH at a first moment,
wherein the terminal device further comprises:
a communications interface configured to receive a repetition termination message fed back by a network device when the PUSCH is transmitted for an nth time, wherein n is a positive integer less than or equal to k, k is a maximum repetition number, and k is a positive integer greater than or equal to 1; and
the computer-executable instructions further configure the one or more processors to start the uplink HARQ RTT timer for the asynchronous HARQ process when receiving the repetition termination message.

8. The terminal device of claim 7 wherein the maximum repetition number is configured for the asynchronous HARQ process by the network device.

9. The terminal device of claim 7 wherein the maximum repetition number is preconfigured for the asynchronous HARQ process.

10. The terminal device of claim 7 wherein the repetition termination message is dynamic scheduling information indicated by using the PDCCH, or, the repetition termination message is an acknowledgment (ACK) frame or a negative-acknowledgment (NACK) frame indicated by using the PDCCH.

* * * * *